C. E. PICKARD.
STOVE ATTACHMENT FOR ECONOMIZING HEAT.
APPLICATION FILED JUNE 23, 1916.
1,245,122.
Patented Oct. 30, 1917.
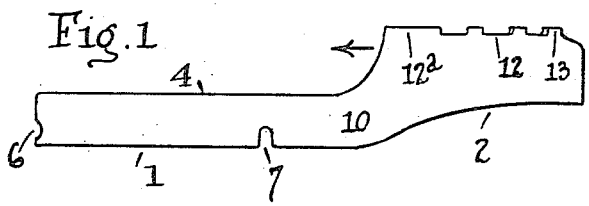
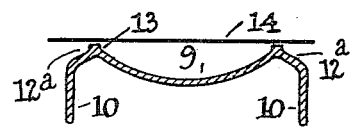
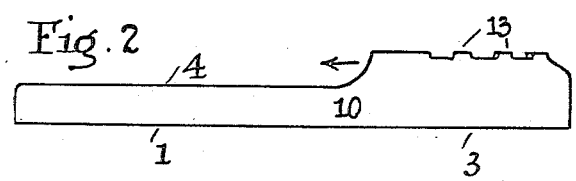
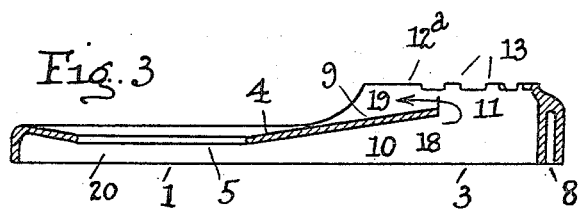
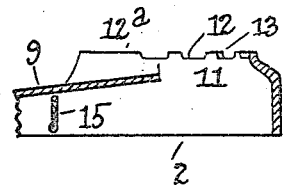
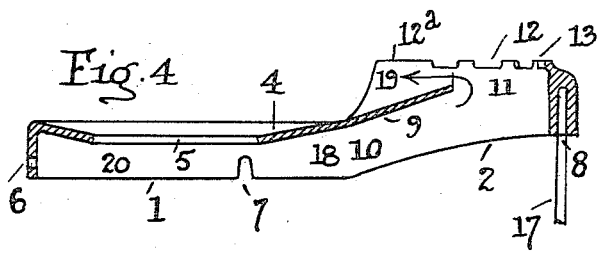
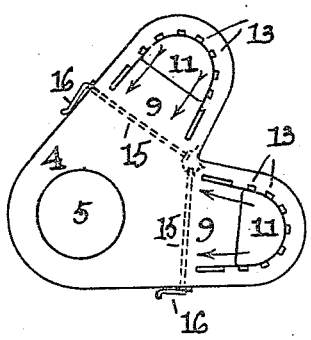
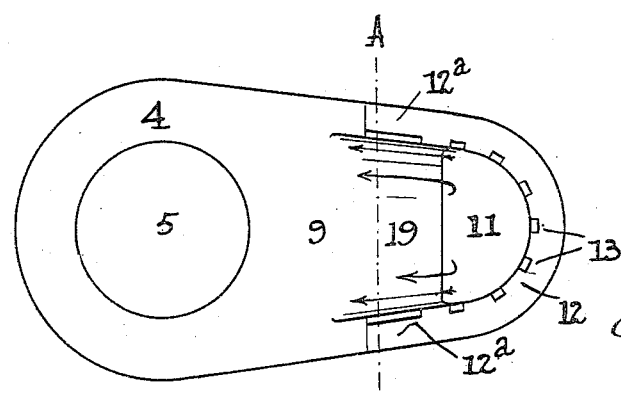
Inventor
Charles E. Pickard
by Jno. Imrie
Atty.

UNITED STATES PATENT OFFICE.

CHARLES EDWARD PICKARD, OF NORTHCOTE, VICTORIA, AUSTRALIA.

STOVE ATTACHMENT FOR ECONOMIZING HEAT.

1,245,122. Specification of Letters Patent. Patented Oct. 30, 1917.

Application filed June 23, 1916. Serial No. 105,459.

*To all whom it may concern:*

Be it known that I, CHARLES EDWARD PICKARD, a subject of the King of Great Britain and Ireland, &c., residing at Northcote, in the State of Victoria, Commonwealth of Australia, have invented certain new and useful Improvements in Stove Attachments for Economizing Heat; and I do hereby declare the following to be a full, clear, and exact description of the invention, such as will enable others skilled in the art to which it appertains to make and use the same.

My invention relates to those stove attachments which enable hot gases from a burner, or ring or group of burners, (hereinafter for brevity called the burner) to be applied in the first instance to the heating of a vessel or object immediately above the burner (hereinafter referred to as the primary vessel) and then to be conveyed where they may be again used so that more than one cooking or other vessel or object may be heated simultaneously. For brevity hereinafter I term each object to be heated, other than the primary vessel, an additional vessel. My improvements economize heat to a greater degree than any other construction I know.

My attachment is such that the support for the primary vessel is at a lower level than the support for the, or each, additional vessel, a rising passage way or flue to each higher support being provided. The primary vessel support is dished, and not intended to allow the heated gases to escape up the sides of that vessel. The dishing allows of exposure of a large area of bottom of the primary vessel to the burner heat.

I provide that the hot gases after reaching part of the bottom of an additional vessel shall be deflected along the rest of the bottom, and this deflection may be toward a place occupied by the primary vessel to be heated. When my attachment is arranged to convey heat from the burner to the supports of one or more of the additional vessels I in some cases provide one or more dampers with means to close or regulate the same at will. The degree of heat supplied to an additional vessel can thus be very usefully regulated.

The shape of each opening to allow heated gases to pass below any additional vessel is such that part of the vessel bottom will extend to one side of the opening, and act as the roof of a passage along which hot gases will travel away from the opening.

The aforesaid and other features of the invention will now be explained by the aid of the accompanying drawings. Figures 1 and 2 are side elevations showing two slightly different attachments. Figs. 3 and 4 are vertical longitudinal sections, Fig. 3 of the attachment in Fig. 2, and Fig. 4 of the attachment in Fig. 1. Fig. 5 is a plan of the attachment in Fig. 1 or Fig. 2. Figs. 1 to 5 show means for heating two vessels or articles simultaneously with one burner. Fig. 6 represents (on a smaller scale than any other figure) a plan of an attachment for heating three vessels from one burner. Fig. 7 is a vertical section longitudinally through part of my stove attachment and illustrates a damper; and Fig. 8 is a vertical section on the line A of Fig. 5.

I manufacture my attachment generally as a casting in one very portable piece of metal—with its bottom uninclosed—no place being left in which dirt can be accumulated, hidden or made hard to reach.

Each stove attachment has any suitable base 1 to rest on the stove, so as to allow the primary vessel (not shown) to stand on a gallery 4 above the burner. In utilizing a gas stove having ample top area, a base 1 having a horizontal extension—3 in Fig. 2—will either wholly rest on the stove top, or may partly project consistently with stability.

A common primus stove, and some methylated spirit stoves have burner galleries of less area than a large gas stove, but still large enough to support one end of my attachment. To fit my attachment securely to the wire burner gallery of some primus stoves, a hole 6 is provided in my attachment and side slots 7 for the respective wires. Any necessary additional support of my attachment may be added, as, in the case of a primus stove, a leg 17 having its top connected to the attachment permanently, or temporarily as in a socket hole 8, the base of the leg resting on the article on which the stove stands—see Fig. 4.

5 is a flame receiving aperture to be located over the burner of the stove. This aperture is in gallery 4 which is dished, to allow vessels put on the gallery to contact with it irrespective of the size of the vessel base. The space 20 is thus a combustion chamber.

The sides 10 of the attachment form in Fig. 6 two extensions, and one in Figs. 1 to 5,—each with a hole 11 of any suitable size and shape within a supporting gallery 12. An upwardly sloping top plate or member 9 extends from the gallery 4 to one side of the hole 11. To wholly or partly close any flame hole 5 or 11 plates (not shown but well known and not claimed as part of this invention) may be provided. They are of use to mitigate the heat reaching vessels put on them, and also to guide hot gases.

The gallery 12 on which each additional vessel may rest, has shallow bosses 13, that allow a small proportion of the gases to pass (to the exterior of any additional vessel set on my attachment) between these bosses to further heat any such vessel above hole 11.

Most of the heated gases passing through hole 11 will be diverted over the plate 9 however, and then pass toward the primary vessel, which thus will receive heat a second time. When the flame creates a draft of such strength as is obtainable with a common large gas stove the form of attachment base in Figs. 2 and 3 is suitable, the sloping plate 9 needing no great rise. For sluggish flames as of primus stoves I prefer a steeper sloping plate 9 having its upper end considerably higher than its base, as in Figs. 1 and 4, and I may economize metal by making the attachment sides 10 slope upwardly at their bases as shown, for these sides need be no deeper than will suffice to prevent escape under them of heated gases from below the primary vessel.

At each side of the upper part of plate 9, my article has at 12ª high sides, so that (under any additional vessel, represented by line 14 in Fig. 8, and over plate 9) there will be a return flue 19 along which heated gases rising through hole 11 will when diverted as aforesaid pass, as indicated by arrows in Figs. 1 to 6. No arrow appears in Fig. 7 because it shows a closed damper 15, which has an external handle 16 or the like. In Fig. 6 two dampers are shown, one for each upwardly sloping flue 18 leading to an opening 11.

The aperture at each hole 11 is of much less area than the bottom of the additional vessel to be heated over it. I prefer the segmental hole shown, so that part of the vessel bottom will be above the plate 9 to complete what I have called the return flue, 19. The plate 9 is thus a partition between flues 18 and 19.

Having described this invention what is claimed by Letters Patent is:—

A heating appliance adapted to be supported on the top of a stove, comprising a top formed near one end with an opening, a continuous wall extending downwardly from the top, said wall at one end being extended above the plane of the top to form a utensil supporting flange, the edge of which is provided with notches, said top extending beyond the forward edge of the utensil supporting flange and terminating some distance from the rear end of said supporting flange to form an opening at the rear end of the appliance, the upper surface of said top inclining downwardly in all directions from the upper horizontal plane of the depending wall toward the opening near the forward end portion of the top, the end portion of the top extended within the confines of the supporting flange being curved in cross section, and forms with the top of the stove supporting the attachment an inclined flue to direct heat from a point below the first mentioned opening to the second mentioned opening at the rear end of the appliance.

In witness whereof I have hereunto set my hand.

CHARLES EDWARD PICKARD.

Copies of this patent may be obtained for five cents each, by addressing the "Commissioner of Patents, Washington, D. C."